United States Patent [19]

Stenzel et al.

[11] Patent Number: 4,881,239

[45] Date of Patent: Nov. 14, 1989

[54] FAULT DETECTION DURING REMELT OF ELECTRODES INTO BLOCKS

[75] Inventors: Otto Stenzel, Gründau; Felix Müller, Gelnhausen; Gerhard Brückmann, Asslar; Alok Choudhury, Püttlingen, all of Fed. Rep. of Germany

[73] Assignee: Leybold Aktiengesellschaft, Hanau, Fed. Rep. of Germany

[21] Appl. No.: 201,588

[22] Filed: Jun. 2, 1988

[30] Foreign Application Priority Data

Jul. 14, 1987 [DE] Fed. Rep. of Germany ....... 3723166

[51] Int. Cl.⁴ .......................................... H05B 7/148
[52] U.S. Cl. ..................................... 373/70; 373/104
[58] Field of Search .................... 373/67, 68, 69, 70, 373/88, 102, 104, 105

[56] References Cited

U.S. PATENT DOCUMENTS

| | | | |
|---|---|---|---|
| 3,364,295 | 1/1968 | Roberts | 373/70 |
| 3,385,920 | 5/1968 | Harbaugh et al. | 373/70 |
| 3,495,018 | 2/1970 | Jackson et al. | 373/70 |
| 4,002,816 | 1/1977 | Zhupkhin et al. | 373/70 |
| 4,048,556 | 9/1977 | Roach et al. | 373/70 |
| 4,578,795 | 3/1986 | Fisher et al. | 373/70 |

Primary Examiner—Roy N. Envall, Jr.
Attorney, Agent, or Firm—Felfe & Lynch

[57] ABSTRACT

Apparatus for the detection and evaluation of process parameters arising during the remelting of an electrode (31) to a metallic block (32) in a vacuum arc furnace detects deviations of at least one process parameter from a predetermined course and uses them to locate faults in the electrode and/or in the metal block (32).

16 Claims, 5 Drawing Sheets

FIG.3A  FIG.3B
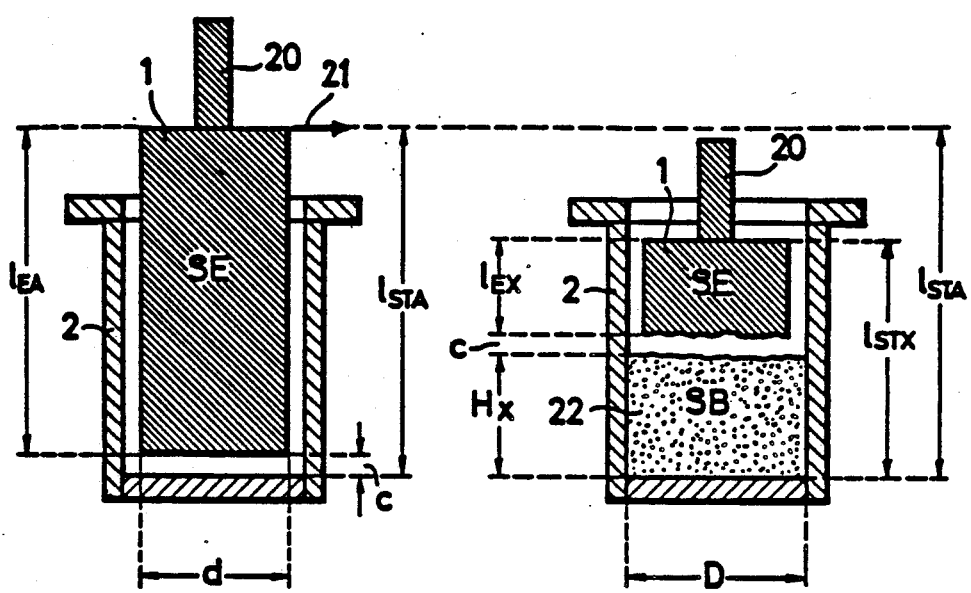
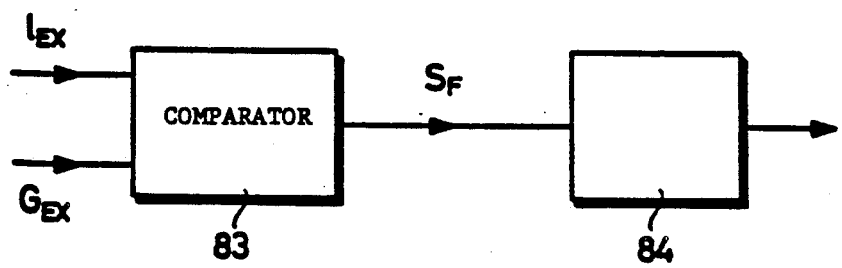
FIG.4

FAULT DETECTION DURING REMELT OF ELECTRODES INTO BLOCKS

BACKGROUND OF THE INVENTION

The invention concerns apparatus for the detection and evaluation of process parameters arising during the remelting of an electrode to a metallic block in a vacuum are furnace.

During the remelting of electrodes into blocks various faults arise. The best-known of these faults are voids or pipes, 'tree-rings', segregations, white spots, 'freckles', non-metallic inclusions and structural disorders. Should one or more of these faults be discovered at certain locations, the whole block is usually thrown away, because the assumption is made that in addition to the discovered locations similar faults are also present at undiscovered positions. This conclusion is, however, often incorrect because the fault arose by a single disturbance of a process parameter which no longer arises again during the subsequent stages of melting. If the site of the fault that has occurred were known, then only the frequently very small faulty location of the block would require excision. The rest of the block could then still be wholly delivered for its proper purpose.

There is already known a process for regulating the course of melting away of self-consuming electrodes, wherein the instantaneous actual weight of the electrode as well as the electrical properties of the section between the electrode and the surface of the melt bath influence the regulation (DE-AS-1,934,218). Here not only are the electric data relating to the arc gap utilized in the regulation, but on this regulation a further regulation of the power input of a metallurgical furnace is superimposed. Thus one is concerned here with a regulation having several influencing parameters. A correlation of faults arising in the melting process to a defined site of the finished block is not possible with this process.

Furthermore, a process for the automation of the electrode melt processes is known, wherein the state of the melting process is determined according to a complex criterion, which takes into account the energy consumed, the harmonic content and fluctuations of the arc current, the spatial position of the electrodes and the temperature of the hottest zone of the delivery (D. A. Gitgarz: The Use of Microprocessors for the Control of Arc and Induction Melting Furnaces, Elektrie 35, 1981, pp. 545–547). A positional correlation of faults is not possible with this process either.

SUMMARY OF THE INVENTION

The invention accordingly concerns the task of providing apparatus for detecting the site of a fault in a block arising during remelting of electrodes to form the block. This is done by detecting the deviations of at least one process parameter from a predetermined course and correlating the deviation to faults in the electrode and/or in the block.

The advantage achieved by the invention consists particularly in that the customers of metallic blocks produced by electrode melting are able to undertake e.g. ultrasonic tests at precisely designated positions of the block in order to sense faults. The rejection rate of finished parts, e.g. turbine discs, is considerably reduced thereby. In addition, the risk of damage to blocks during forging is lowered.

BRIEF DESCRIPTION OF THE DRAWINGS

FIGS. 3A and 3B are a schematic representation of the electrode melting process, to elucidate the computation of the remaining length of the electrode;

FIG. 4 shows a circuit for evaluating signals;

DETAILED DESCRIPTION OF THE PREFERRED EMBODIMENTS

Figure 1:
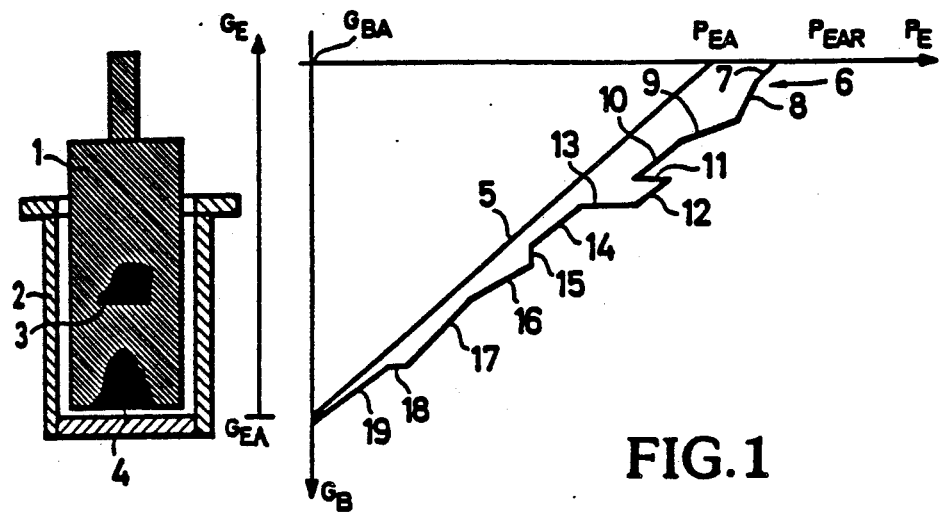
FIG. 1 is a schematic representation of the influence on the growth of a block of non-uniformities during electrode melting.

In FIG. 1 the dependence of the weight of the electrode $G_E$ on the position $P_E$ of the electrode support is represented, where at the same time the cast or molten electrode 1 with included faults 3, 4 is shown within a vessel 2. At the beginning of the melting process the electrode still has its full weight $G_{EA}$, and moreover in the position $P_{EA}$, while the block is not present at all yet and thus the weight $G_{BA}$ is zero. The reduction in the electrode weight $G_E$ is connected during the melting process with the increase in the weight $G_B$ of the block. If one assumes that the electrode 1 is melted extensively void-free, one can very precisely determine from the weight of the electrode 1 and the geometric dimensions of the mould the corresponding height of the block for signalling. From the position $P_E$ of the electrodes and the instantaneous weight $G_E$ of the electrodes the total density of the residual electrode may be determined at each point in time of the melting process. When there is a void in the electrode, a linear correlation beween the electrode position or reduction and the electrode weight loss can no longer be expected.

The theoretical course of weight loss of a void-free electrode is designated in FIG. 1 with the straight line 5. When a significant deviation of the weight loss from the linear course occurs, it may be assumed that e.g. a piece of the electrode has fallen off.

A possible real course of the weight reduction of the electrode is represented by the measurement curve 6. At the beginning of the melting process the weight of the electrode is $G_{EA}$ and this is moreover at position $P_{EAR}$. In the region 7 the weight loss runs linearly at first, and then in region 8 deviates significantly from a linear run. This significant deviation infers a thickening or change in density of the electrode. Should the measurement curve 6 change now via a reversed deviation 9 to a linear region 10, a thinning or change in density is indicated. A short jump-back of the measurement curve 6 towards the initial position, designated with region 11, refers to a short-circuit with electrode retraction. From this juncture the measurement curve 6 returns to a linear region 12 again, from where it passes to a region 13, which indicates the appearance of a large horizontal void. Then the curve 6 runs along a further linear region 14 which jumps into the disturbance region 15 that refers to the falling down of a piece of electrode. The further regions 16–19 of the curve 6 signify a nearly normal burn-off of the electrode.

Figure 2:
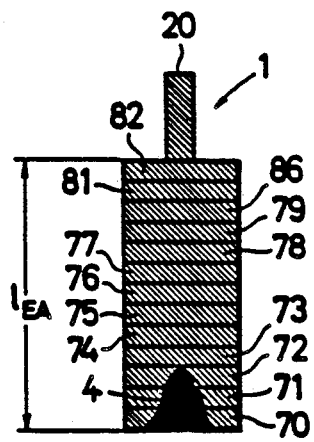
FIG. 2 shows an electrode with an included fault.

In FIG. 2 electrode 1 is shown again, wherein the fault 4 is again recognized, the fault concerned being a void. If one considers this electrode as having a length $l_{EA}$ divided into several identical slices 70–82, and if one further assumes that the electrode is melted off from below upwardly, then it will be recognized that in the region of slices 70–74 there is no close relationship between the height of the melted-off part and its weight, since the weight of the slice 70 is considerably smaller than the weight of the slice 73 of equal weight. Only in the upper region of the electrode 1 characterised by slices 76–82 does a close relation exist again between the weight of the melted-down electrode part and the height, insofar as the electrode—as is in general the case—melts off horizontally in a uniform manner.

The deviation of the relationships of the weight of the electrode 1 to the length of the electrode 1 from a predetermined function thus permits an inference to be made about a fault, especially a void, in the electrode.

It is therefore important to monitor this weight-/length ratio. The weight of the not-yet-melted off residual electrode is in general detected by a measuring device connected to the electrode with an electrode rod. As against this, the measurement technology is difficult for detecting the residual length of the electrode 1, because at the position where the electrode 1 is melted off, very high temperatures arise. Preferably, therefore, the electrode length is computed.

In FIG. 3A an electrode 1 is represented at the beginning of the melt-off procedure and provided with geometrical reference magnitudes. The length of the electrode 1 at the beginning of the melting process is designated with $l_{EA}$, while d indicates the diameter of the electrode and $l_{STA}$ is the distance between the attachment of the electrode rod 20 and the bottom of the vessel 2.

The distance between the bottom of the vessel 2 and the underside of the electrode 1 is indicated by c. The spacing $l_{STA}$ is as a rule given by a position indicator 21 connected to the electrode rod 20 and which indicates how far the electrode 1 has already sunk.

FIG. 3B shows the same arrangement as FIG. 3A, but where a major portion of the electrode 1 has already melted off and become block 22. The specific weight of the electrode 1 is designated with $\rho_E$, while the specific weight of the block is designated with $\rho_B$. Assuming a cylindrical vessel 2, the desired residual length $l_{Ex}$ of the electrode 1 may be obtained by the following equations.

$$l_{Ex} = l_{STx} - c - Hx \tag{a}$$

$$V_{Block\ x} = \frac{\pi}{4} D^2 \cdot Hx;\ Hx = \frac{V_{Block\ x} \cdot 4}{\pi \cdot D^2} \tag{b}$$

Hx substituted into equation (a) results in:

$$l_{Ex} = l_{STx} - c - \frac{V_{Block\ x} \cdot 4}{\pi \cdot D^2} \tag{c}$$

However, $$\frac{V_{Block\ x}}{G_{Block\ x}} = \rho_B = \text{const, , where}$$

$V_{Block\ x}$ is the volume of the block of height Hx and $G_{Block\ x}$ is the weight of this block.

$V_{Block\ x}$ is thus $G_{Block\ x} \cdot \rho_B$. Substituting this into equation (c), one obtains $$l_{Ex} = l_{STx} - c - \frac{G_{Block\ x} \cdot \rho_B \cdot 4}{\pi \cdot D^2} \tag{d}$$

But $G_{Block\ x}$ corresponds to the weight of the electrode 1 at the beginning of the melting-off process less the weight $G_{Ex}$ of the residual electrode:

$$G_{Block\ x} = G_{EA} - G_{Ex}$$

Substituting this into equation (d), one obtains $$l_{Ex} = l_{STx} - c - \frac{(G_{EA} - G_{Ex}) \cdot \rho_B \cdot 4}{\pi \cdot D^2} \tag{e}$$

This equation contains only known magnitudes—c, D, $\pi$, $\rho_B$, $G_{EA}$—or those that are continuously measured or indicated—$G_{Ex}$, $l_{STx}$.

In FIG. 4 it is shown schematically that the magnitudes $l_{Ex}$ and $G_{Ex}$ are fed to a comparator 83 in which the ideal $G_{Ex}/l_{Ex}$ correlation is stored, i.e. a correlation for a fault-free electrode 1. This correlation is compared with the actual correlation and when the deviation of the actual correlation from the ideal correlation exceeds a predetermined amount, a signal $S_F$ is generated and displayed or processed. It is also possible to differentiate the signal $S_F$ by a differentiating unit 84, to render the deviation clearly recognizable.

Figure 5:
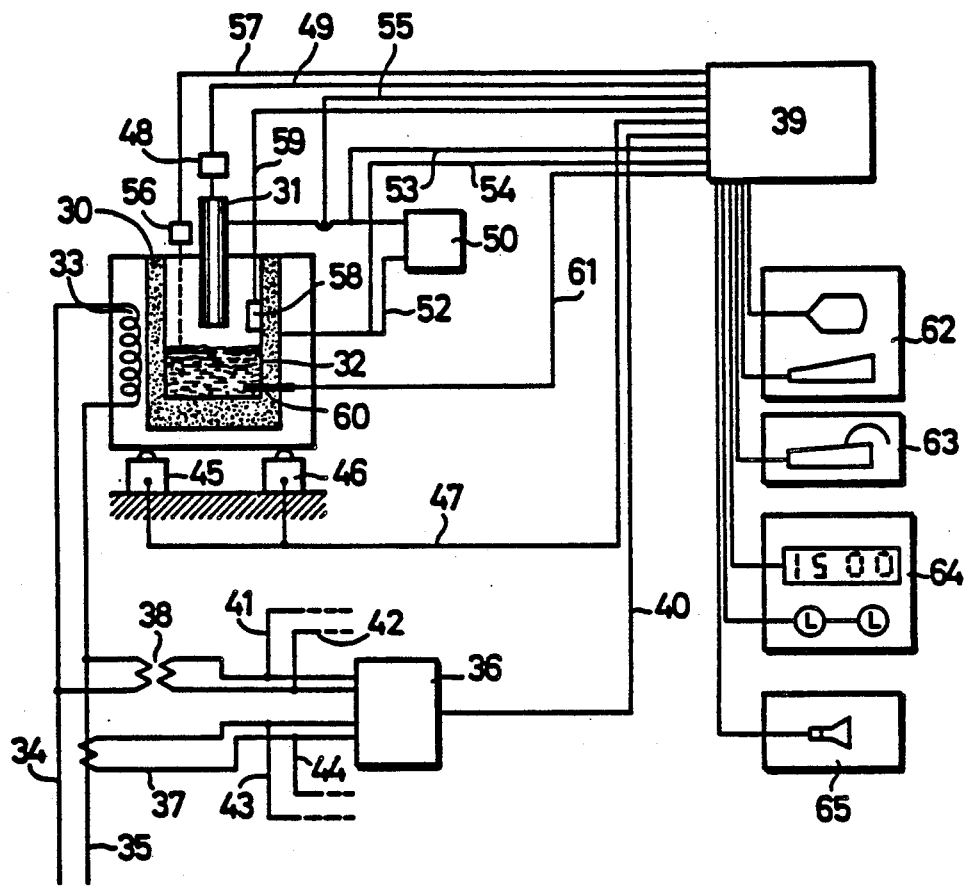
FIG. 5 is a schematic representation of apparatus for detecting and evaluating a plurality of disturbances during the melting process.

Apparatus for detecting and processing a plurality of data is schematically represented in FIG. 5, the apparatus enabling the most important events during the melting of an electrode to be recorded and, on the basis of an event diagram or catalogue, to characterise the fault inclusions in the 'block' end product. The representation of FIG. 5 is kept very general and is not restricted to vacuum arc furnaces, which is the preferred context of use of the invention. A melting crucible is designated by 30 and in it is collected the melting charge 32 coming from the electrode 31. The melting crucible 30 is surrounded by an electric heating device 33 powered via conductors 34, 35 from a non-illustrated power source. The electric heat output is detected by means of a KW counter which has a current measuring device 37 and a voltage measuring device 38. The instantaneous heat output is inputted to a microcomputer 39 via a data line 40. In addition to the power it is also possible to input directly the current and voltage into the microcomputer 39, which is signified by data lines 41, 42 and 43, 44 respectively.

The crucible 30 together with the heating device 31 rest on a weighing device represented by two pressure cells (load cells) 45, 46. The electrical measurementvalues of these load cells are also reported via a further data line to the microcomputer 39. In this way the actual weight at any time of the crucible 30 with the melting charge 32 is known.

The weight of the electrode 31 is detected by a weight measuring device 48 which reports the actual weight of the electrode 31 via a data line 49 to the microcomputer 39. A voltage is applied between the electrode 31 an the crucible 30, this voltage being supplied from a power source 50 via respective conductors 51 and 52 to the electrode 31 and the crucible 30. This voltage is reported via data lines 53, 54 to the microcomputer 39 which also receives information concerning the current via another data line 55.

The height of the surface of the melting charge 32 is detected by a measuring device 56 based e.g. on the principle of wave reflection from the surface of the melting charge 32. The instantaneous actual melt surface is reported to the microcomputer 39 over a data line 57.

In a corresponding manner the instantaneous position of the underside of the electrode 31 may be detected via a measurement device 59 and reported to the microcomputer via a data line 59.

As has already been explained above, since the measurement technology of detecting the position of the surface of the melting charge 32 and the underside of the electrode 31 is very difficult, these positions may also be computed.

The temperature of the melt is detected by means of a thermocouple device 60 which reports the instantaneous actual temperature to the microcomputer 39 over a line 61.

The microcomputer 39 evaluates all the input data on the basis of a program to the effect that it assigns a fault type to a predetermined height of the block. This correlation may be represented on a terminal screen 62 or by means of a printer 63.

In addition it is also possible to display particularly interesting data, for example the temperature of the melting charge 32, on an indicating device 64.

Should particularly significant faults arise, they may be indicated by means of an acoustic signal 65.

The records of the microcomputer reproduced on the terminal screen 62 or the printer 63 may look something like the following:

| Melt time Interval | Disturbance Events | Type of Fault | z-coordinate of the block (height) | x-coordinate of the block | y-coordinate of the block |
|---|---|---|---|---|---|
| 1-2 mins | — | — | — | — | — |
| 2-3 mins | — | — | — | — | — |
| 3-4 mins | Mains voltage interruption | Void | 2 cm | 20 cm | 15 cm |

It is inferred from the measurement records that in the first three minutes no disturbances arose. After these three minutes a line voltage interruption occurred for one minute, which typically causes a void (pipe). This void was correlated to a defined location of the block on the basis of the other data fed to the microcomputer 39, this location being captured by three coordinates x, y, z. If one is concerned more with a point-like fault, then in place of the x and y coordinates the respective regions $\Delta x$ and $\Delta y$ are indicated. The x, y, and z coordinates may be gained by the evaluation of load cell signals.

It is understood that process parameters other than those mentioned may be evaluated. For example, the detection of gas evolution is important particularly in vacuum arc furnaces.

What is claimed is:

1. Apparatus for detecting the location of a fault in a metallic block during the remelting of an electrode in a vacuum arc furnace to form said block, said apparatus comprising
    means for monitoring a first process parameter,
    means for monitoring a second process parameter,
    means for continuously correlating the first process parameter to the second process parameter,
    means for comparing the actual correlation of parameters so monitored to the ideal correlation of said parameters for a fault-free electrode, and
    means for determining the position of faults in the block from deviations between the actual correlation and the ideal correlation.

2. Apparatus as in claim 1 wherein said means for monitoring said first process parameter comprises means for weighing said electrode, said first process parameter being the instantaneous weight of the electrode.

3. Apparatus as in claim 1 wherein said means for monitoring said second process parameter comprises means for determining the instantaneous position of the electrode, the second process parameter being the instantaneous position of the electrode.

4. Apparatus as in claim 1 wherein said means for monitoring said second process parameter comprises means for determining the instantaneous length of the electrode during the remelt process, said second process parameter being the instantaneous length of the electrode.

5. Apparatus as in claim 4 wherein said means for determining the instantaneous length of the electrode comprises means for determining the position of the electrode.

6. Apparatus as in claim 1 wherein one of said means for monitoring a process parameter comprises means for measuring the melting current.

7. Apparatus as in claim 1 wherein one of said means for monitoring a process parameter comprises means for measuring the melting voltage.

8. Apparatus as in claim 1 wherein one of said means for monitoring a process parameter comprises means for measuring the rate of feed of the electrode.

9. Apparatus as in claim 1 wherein one of said means for monitoring a process parameter comprises means for measuring the melting rate of the electrode.

10. Apparatus as in claim 1 wherein one of said means for monitoring a process parameter comprises means for measuring the number of drop shorts per unit time.

11. Apparatus as in claim 1 wherein one of said means for monitoring a process parameter comprises means for measuring the rate of flow of cooling water required to maintain a given temperature of the melt.

12. Apparatus as in claim 1 wherein one of said means for monitoring a process parameter comprises means for measuring the pressure developed in a vessel containing the furnace.

13. Apparatus as in claim 1 wherein one of said means for monitoring a process parameter comprises means for measuring the time transpired since melting began.

14. Apparatus as in claim 1 wherein one of said means for monitoring a process parameter comprises means for measuring the sound produced during melting.

15. Apparatus as in claim 14 wherein said means for for measuring sound produced during melting comprises a microphone for converting the sound to electric current.

16. Apparatus as in claim 1 wherein said means for determining the position of a fault only determines the position of a fault when the deviation exceeds a predetermined value.

* * * * *